United States Patent
Sheu et al.

(10) Patent No.: US 10,340,822 B2
(45) Date of Patent: Jul. 2, 2019

(54) MOTOR CONTROL SYSTEM

(71) Applicant: Delta Electronics, Inc., Taoyuan (TW)

(72) Inventors: Hong-Cheng Sheu, Taoyuan (TW); Chien-Yu Lai, Taoyuan (TW); I-Wen Tsai, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 15/961,063

(22) Filed: Apr. 24, 2018

(65) Prior Publication Data

US 2018/0375448 A1 Dec. 27, 2018

(30) Foreign Application Priority Data

Jun. 23, 2017 (TW) .............................. 106121035 A

(51) Int. Cl.
*H02K 3/12* (2006.01)
*H02P 6/08* (2016.01)
*H02P 25/18* (2006.01)

(52) U.S. Cl.
CPC ................ *H02P 6/08* (2013.01); *H02P 25/18* (2013.01); *H02K 3/12* (2013.01)

(58) Field of Classification Search
CPC ........................................................ H02P 6/08
USPC ................................ 318/400.09, 400.01, 700
See application file for complete search history.

(56) References Cited

U.S. PATENT DOCUMENTS

| 7,893,587 B2 * | 2/2011 | Comte ..................... H02K 3/28 310/179 |
| 2014/0239876 A1 | 8/2014 | Hao |
| 2017/0151947 A1 | 6/2017 | Kim |

FOREIGN PATENT DOCUMENTS

| EP | 2 624 444 A2 | 8/2013 |
| JP | 2002058189 A | 2/2002 |
| JP | 2010200404 A | 9/2010 |
| JP | 2013162615 A | 8/2013 |
| JP | 2014150655 A | 8/2014 |

OTHER PUBLICATIONS

European Patent Office, Office Action, dated Jan. 29, 2019, 8 pages.

* cited by examiner

*Primary Examiner* — David Luo
(74) *Attorney, Agent, or Firm* — Muncy, Geissler, Olds & Lowe, P.C.

(57) ABSTRACT

A motor control system includes an electric motor and inverter. The electric motor includes a stator, rotor, and winding structure. The stator includes an iron core with a plurality of slots formed therein along a radial direction of the stator. The winding structure has a plurality of hairpin wires with pins disposed in the slots. The winding structure is configured to provide a plurality of phase windings and each phase winding includes a plurality of motor windings. The inverter includes a switching controller configured to control the turning-on and turning-off of the motor windings of each phase winding of the winding structure. When the electric motor operates in a high-speed mode, the switching controller controls the turning-on and turning-off of the motor windings of each phase winding such that a number of the phase windings turned-on is ⅓ less than a number of all the phase windings.

16 Claims, 9 Drawing Sheets

MOTOR CONTROL SYSTEM

CROSS REFERENCE TO RELATED APPLICATIONS

This Application claims priority of Taiwan Patent Application No. 106121035, filed on Jun. 23, 2017, the entirety of which is incorporated by reference herein.

BACKGROUND

Field of the Invention

The present invention relates to a motor control system for controlling a number winding groups of a motor, and in particular it relates to a motor control system for controlling an electric motor of a vehicle.

Description of the Related Art

The number of vehicles using a motor control system driven by electric power has increased in recent years. The motor used in a motor control system generally has a stator and a rotor, and a plurality of copper wires with the same cross-sectional area are inserted into each slot of the stator to form the windings. Phase current is applied to the copper wires in the slots to generate a rotating magnetic field, thereby generating the electromotive force needed to rotate the rotor. As the rotation speed of the rotor increases, the counter electromotive force in the electric motor will gradually increase. Since the turns on the winding are fixed, a problem arises in which the speed cannot be increased after the counter electromotive force reaches the upper limit of voltage. A general solution is to use a weak magnetic force to decrease the counter electromotive force, so as to increase the upper limit of the rotation speed, but this method requires additional current to generate the magnetic flux required for the weak magnetic force. As a result, efficiency decreases. Moreover, the increase in the rotation speed gained by using this method is limited, and eventually the operating interval cannot be expanded substantially.

SUMMARY

According to an aspect of the present invention, there is provided a motor control system capable of controlling turning-on and turning-off of a plurality of motor windings. The motor control system comprises an electric motor and an inverter. The electric motor comprises a stator, a rotor, and a winding structure. The stator includes an iron core with a plurality of slots formed therein along a radial direction of the stator. The rotor is surrounded by the stator. The winding structure has a plurality of hairpin wires with pins disposed in the slots, the hairpin wires forms a plurality of layers of conduction-wire, wherein the winding structure is configured to provide a plurality of phase windings and each phase winding includes a plurality of motor windings. The inverter is connected to the motor windings, the inverter includes a switching controller configured to control the turning-on and turning-off of the motor windings of each phase winding of the winding structure. When the electric motor operates in a high-speed mode, the switching controller controls the turning-on and turning-off of the motor windings of each phase winding such that a number of the phase windings turned-on is ⅓ less than a number of all the phase windings.

According to another aspect of the present invention, there is provided a motor control device for driving an electric motor having a plurality of layered hairpin windings. The motor control device includes an inverter and a switching controller. The inverter is configured to input three phase currents into the electric motor to turn-on the layered hairpin windings. The switching controller is configured to operate the motor control device in at least a high-speed mode and a low-speed mode. In the high-speed mode, the switching controller controls the input of the three phase currents to turn-on ⅔ of the total number of the layered hairpin windings.

A detailed description is given in the following embodiments with reference to the accompanying drawings.

DETAILED DESCRIPTION OF THE EMBODIMENTS

Figure 1:
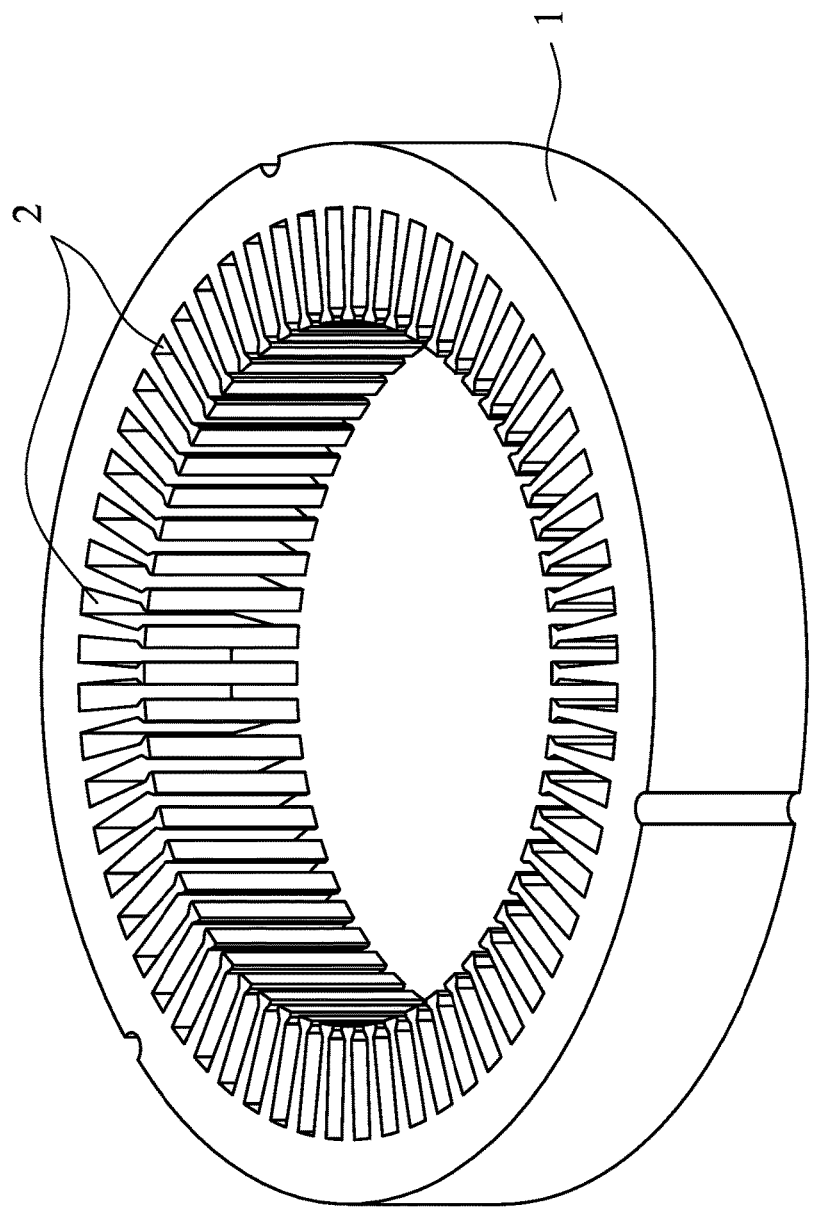
FIG. 1 is a schematic view of a stator of an electric motor of a motor control system according to an embodiment of the invention.

The exemplary embodiments set forth herein are used merely for the purpose of understanding the present invention, and the inventive concept may be embodied in various forms without being limited to those exemplary embodiments. The use of like and/or corresponding numerals in the drawings of different embodiments may not necessarily suggest any correlation between different embodiments.

Figure 2:
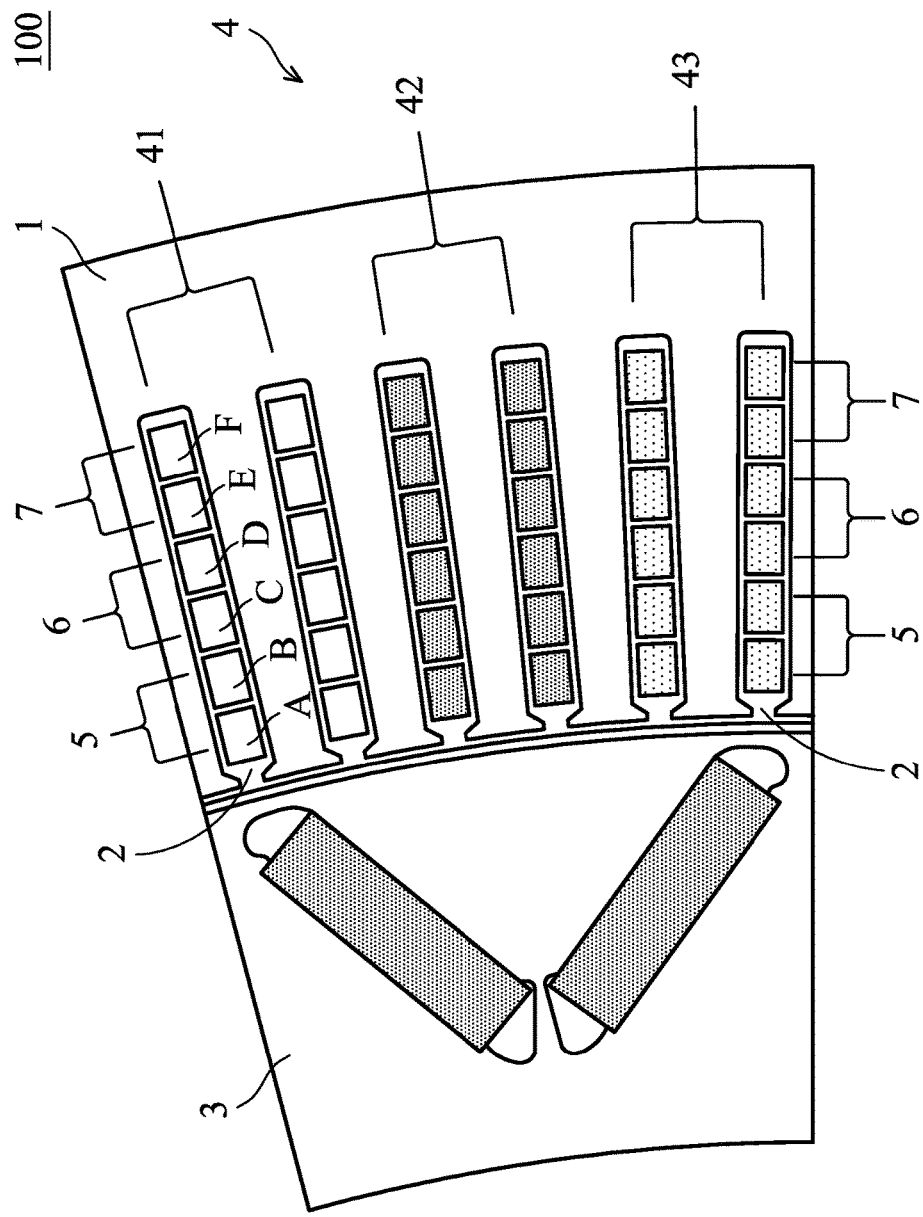
FIG. 2 is a schematic view of a partial structure of an electric motor in which all winding groups are turned on, according to an embodiment of the invention.
Figure 3:
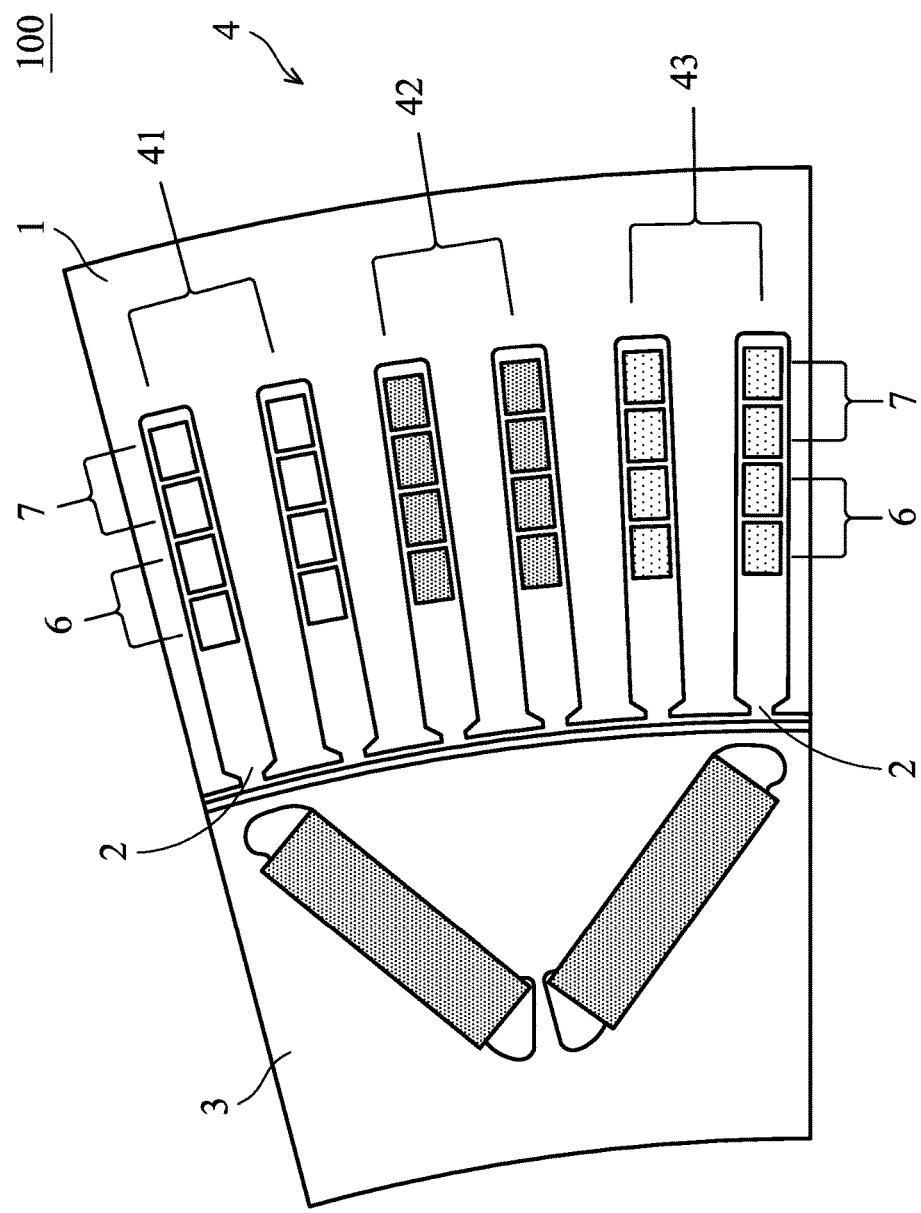
FIG. 3 is a schematic view of a partial structure of an electric motor in which the number of turned-on winding groups is ⅓ less, according to an embodiment of the invention.
Figure 7:
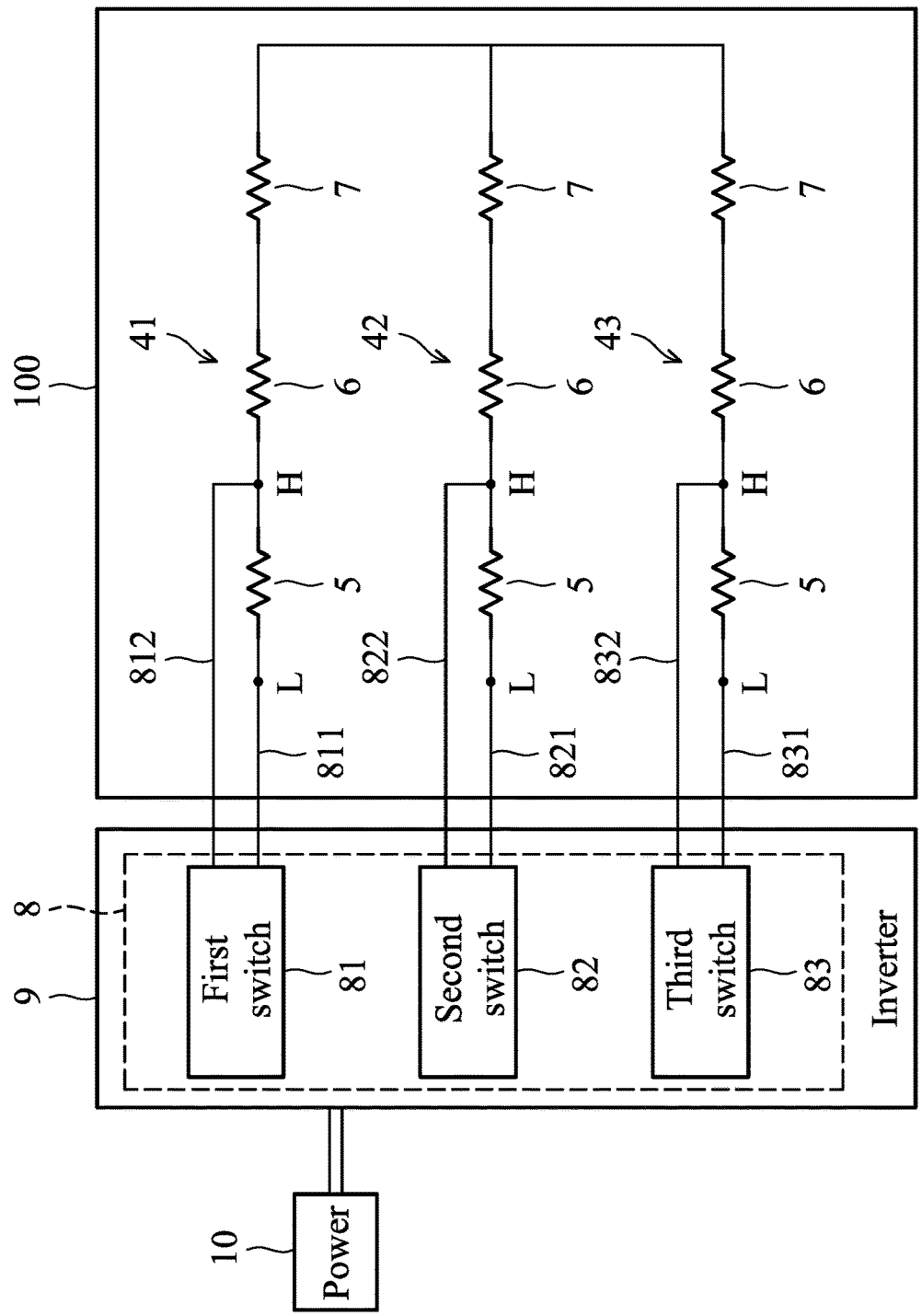
FIGS. 7, 8 and 9 are schematic representations of switching controllers according to different embodiments of the invention.
Figure 8:
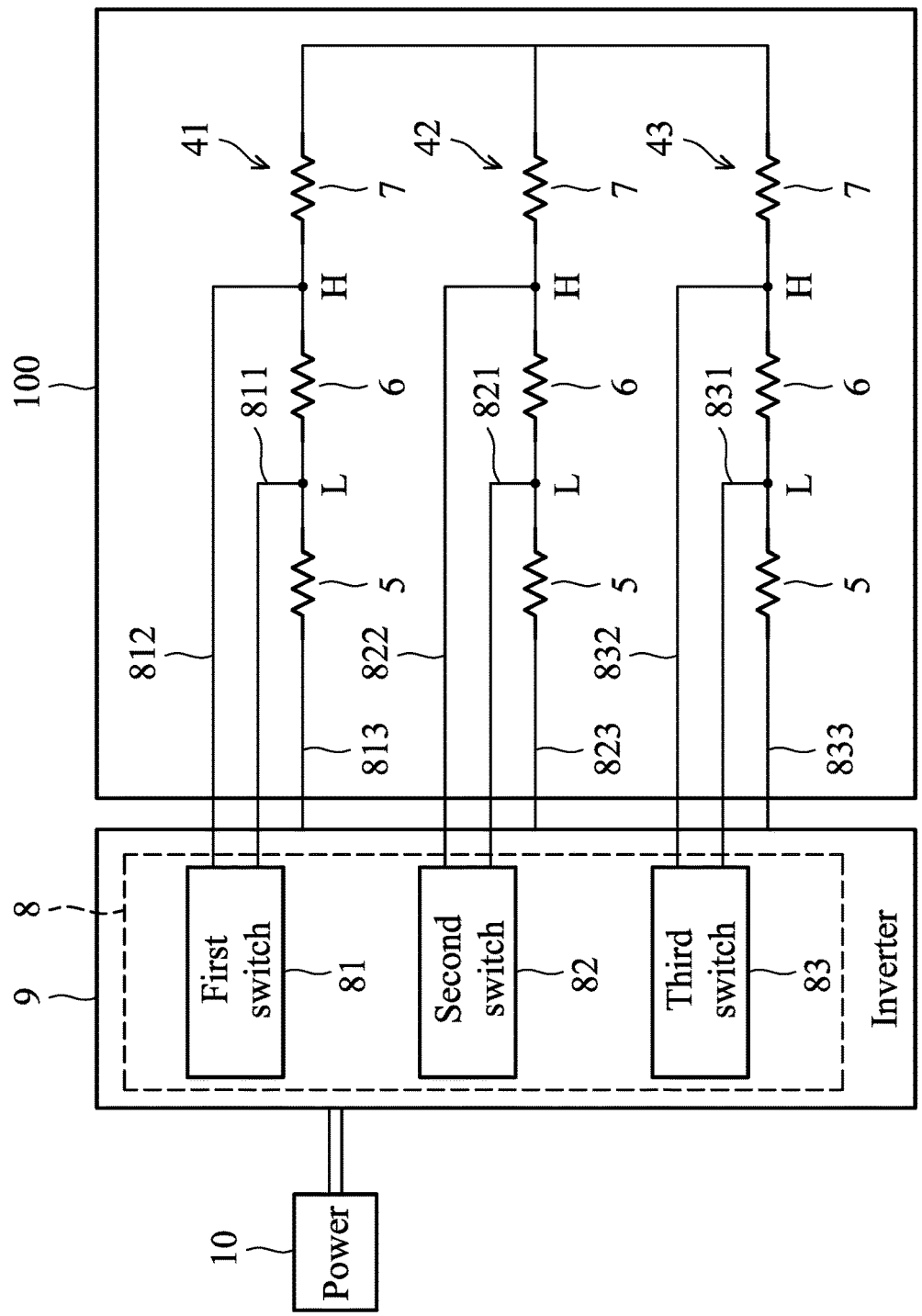
Figure 9:
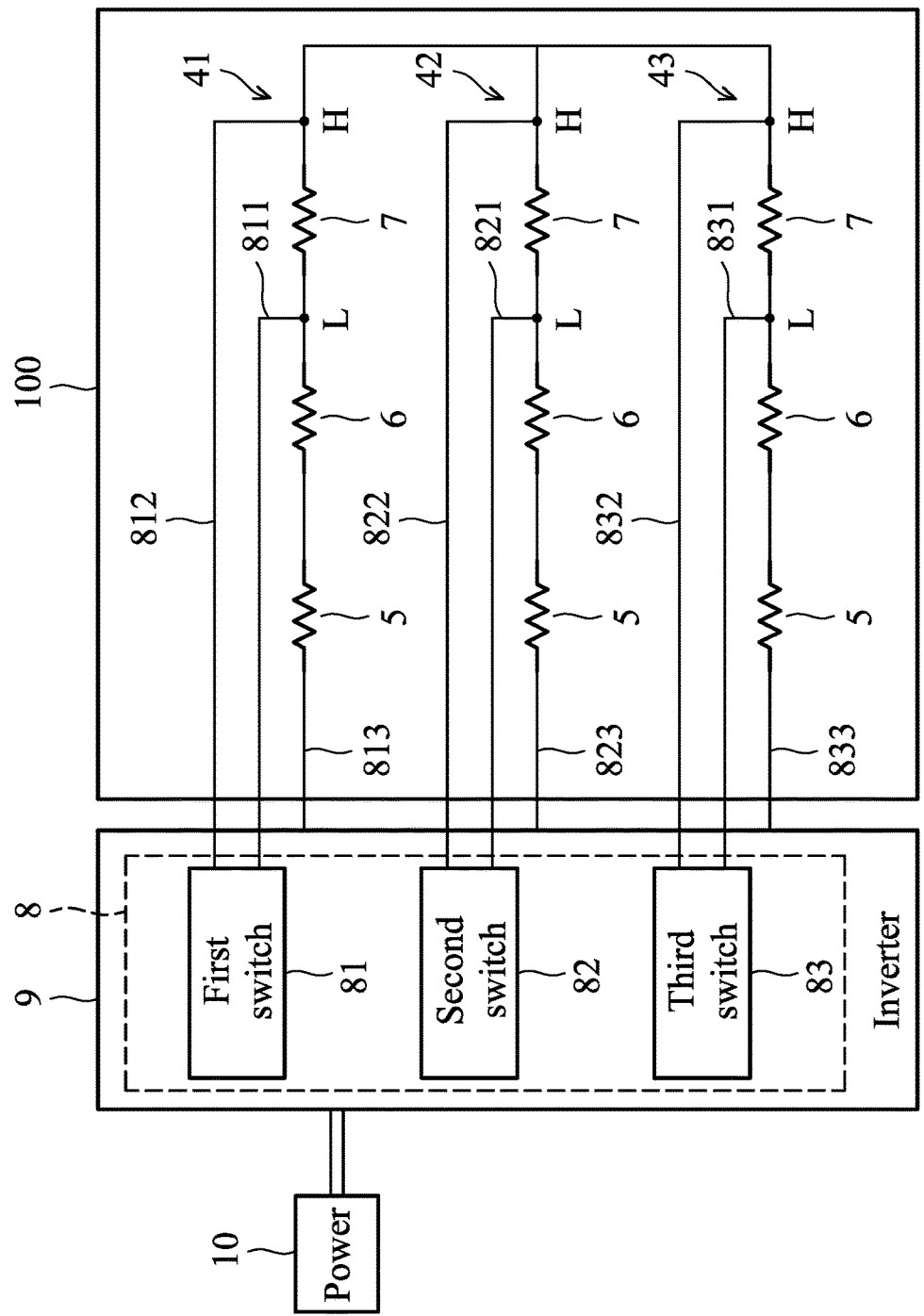

A motor control system according to an embodiment of the present invention comprises an electric motor 100 (shown in FIGS. 2 and 3) and an inverter 9 (shown in FIGS. 7 to 9). The electric motor 100 comprises a stator 1 and a rotor 3. Shown in FIG. 1, the stator 1 is an iron core with a hollow ring shape, and a plurality of slots 2 is formed on the iron core. FIGS. 2 and 3 show a partial structure of the stator 1 and the rotor 3 of the electric motor 100, in which the rotor 3 is disposed in the hollow ring center of the stator 1 and is surrounded by the stator 1. A winding structure 4 is disposed in the slots 2, and the winding structure 4 could be constituted by inserting pins of a plurality of hairpin type wires into the slots 2. The winding structure 4 has a plurality of phase windings, such as a V phase winding 41, a W phase winding 42 and a U phase winding 43. Each of the phase windings respectively has plurality of motor windings 5, 6, and 7.

Referring to FIGS. 2 and 3, together with FIGS. 7 to 9, the inverter 9 connects a power source 10 to motor windings 5, 6, and 7 and has a switch controller 8. The switch controller 8 connects motor windings 5, 6, and 7 of each of the phase windings, and controls the turning-on and turning-off of motor windings 5, 6, and 7 of each phase windings.

In the embodiment, the winding structure 4 has the V phase winding 41, the W phase winding 42, and the U phase winding 43, each of the phase windings includes a first motor winding 5, a second motor winding 6 and a third motor winding 7, respectively, but the number of phase windings and the number of motor winding are not limited. The first, second, and third motor winding 5, 6, and 7 may be connected by short pitch wires, and be configured in series according to the required design. The first, second, and third motor winding 5, 6, and 7 in each of the phase windings are connected by full pitch wire, to configure each of the first motor winding 5 of each phase winding such that: the V phase winding 41, the W phase winding 42, and the U phase winding 43 are connected to each other; each of the second motor windings 6 are connected to each other; and each of the third motor winding 7 are connected to each other. The switch controller 8 is configured to be capable of turning off any of the first, second and third motor windings 5, 6, and 7.

Next, the configuration of the winding structure 4 in the slots 2 will be described below. As shown in FIG. 2, in each of the slots 2 of the stator 1, the winding structure 4 has a first layer to a sixth layer of conduction-wire A to F sequentially disposed along a radial direction. The layers of conduction-wire substantially surround the annular iron core and are concentrically arranged. In other words, each of the first to sixth layers of conduction-wires A to F is arranged as a six-layer concentric distribution in the slots 2. In this embodiment, it also can be described that the winding structure 4 has a first winding to a third winding sequentially disposed along a radial direction of the stator 1. As shown in FIG. 2, the slots 2 form an opening towards the hollow ring center, towards the rotor 3. The first and second layers of conduction-wire A and B, which are disposed in the position nearest to the opening, are configured to form the first motor windings 5. The third and fourth layers of conduction-wire C and D, which are disposed in the radially middle position, are configured to form the second motor windings 6. The fifth and sixth layers of conduction-wire E and F, which are disposed in the position furthest away from the opening, are configured to form the third motor windings 7. The control of the electric motor could be more precisely controlled by the windings arrangement and grouping according to the expected operation interval.

Note that the present invention is not limited to the motor winding configurations of adjacent layers of the conduction-wire. That is, a winding group can be configured by non-adjacent layers of the conduction-wire, or by three layers of the conduction-wire to form a winding group. Furthermore, although the control of turn-on/turn-off of winding group in the slots 2 of the present invention are preferably configured to open circuit (i.e. turn-off) the winding group that is closer to the rotor 3 (for reducing the iron loss of the stator and increase the generation of the torque), it is envisaged that the control is also able to turn-off one or more other winding groups that is not located proximal to the slots 2 opening which faces the rotor 3.

The winding structure 4 of the present invention is preferably configured by a plurality of hairpin type wires. Each of the hairpins may have two pin legs which are directly inserted into the slots 2 as two wires. For example, one layer of the first to sixth layers of conduction-wire A to F of each of the slots as shown in FIG. 2 is a pin leg of the hairpin. The wires may be connected after the pin legs are inserted into the slots to achieve short pitch and/or full pitch connections. For example, the pin legs of different hairpins may be connected by welding. In this manner, the effectiveness of the conductors occupying the spaces in the slots can be improved. The efficiency of assembling the electric motor 100 can also be increased.

Referring to embodiments of the electric motor 100 shown in FIGS. 7 to 9, two operation modes are provided: a low-speed mode, and a high-speed mode. Note these modes can be switched by the switch controller 8.

When the electric motor 100 operates in a high-speed mode, the switching controller 8 controls the number of turned-on windings of each of the phase windings to be reduced by ⅓. By reducing the number of turned-on windings of the windings structure 4 by ⅓ less, the counter electromotive force of the electric motor 100 can be decreased. As shown in FIG. 7 (and FIG. 3), for example, the switching controller 8 only connects the motor second winding 6 to the third motor winding 7 and reduces activation of ⅓ of the number of all windings.

Figure 4A:
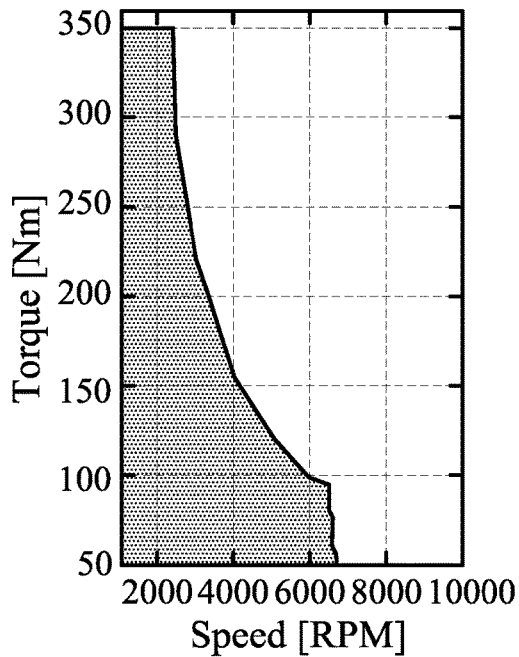
FIG. 4A is a graph of an operation interval of an electric motor in a fully turned-on state.

In the low-speed mode, conduction of the windings of the electric motor 100 is fully turned-on (as shown in FIG. 2). With this configuration, the switch controller 8 controls the connection of the first motor winding 5, the second motor winding 6 and the third motor winding 7 in each of the V phase winding 41, the W phase winding 42 and the U winding phase 43 such that they are connected in series. All windings are turned on to generate greater magnetic flux, and the winding structure 4 can provide greater electromagnetic torque applying to rotor 3, for example when the rotor 3 is being started or requires high torque output. FIG. 4A shows a graph of the operation interval diagram with rotating speed-torque curve of the electric motor 100 in a normal mode (the low-speed mode). In this operation interval, the top torque can be up to 350 N·m (newton·meter), and the top rotating speed can be up to 6000 rpm (rotation per minute).

Figure 4B:
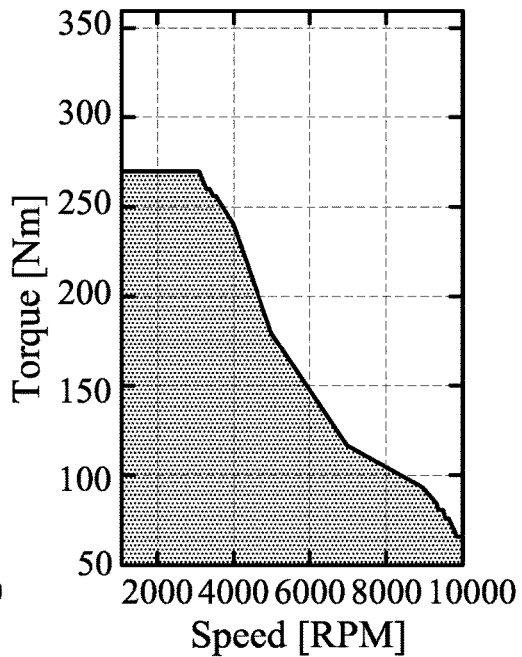
FIG. 4B is a graph of an operation interval of an electric motor in a state in which the number of turned-on winding groups is ⅓ less.

In the high-speed mode, the windings of the electric motor 100 are not fully turned-on (as shown in FIG. 3). In this embodiment, the switch controller 8 turns off the first motor windings 5 of each of the phase windings, thus only the second motor windings 6 and the third motor windings 7 of the V phase winding 41, W phase winding 42, and U phase winding are turned on. In this control configuration, the number of turned-on windings in each of the phase windings is reduced by ⅓ compared to the low-speed mode. In other words, the number of turned-on windings of the low-speed is ⅔ of the number of all windings of the winding structure 4. In the high-speed mode, the counter electromotive force (generated by increasing the rotating speed of the rotor 3) can be decreased by reducing the activation of the equivalent turns of the windings, and the rotor 3 can reach a high rotation speed. FIG. 4B shows a graph of the operation interval diagram with rotating speed-torque curve of the electric motor 100 in the high-speed mode. In this operation interval, the top torque can be up to 270 N·m, and the top rotating speed can be up to 10000 rpm.

As described above and referring to FIG. 7, because the first windings 5 of the three windings are closest to the rotor 3, the switch controller 8 turns off the first motor windings 5 to decrease the proximity effect applied by the rotor 3. Further, because the first motor windings 5 experiences large copper loss due to the proximity effect, the first motor windings 5 are controlled to be turned off to reduce the copper loss in a high-speed and low load interval. Thus the efficiency of the motor can be increased and the top rotating speed of the operation interval can be higher, which means that the electric motor 100 can achieve better operation efficiency by turning off the first motor windings 5. Although controlling the turning off of the first motor windings 5 proximal to the rotor 3 is a preferred embodiment of the present invention, in other embodiments the switch controller 8 can turn off the second motor windings 6 in the middle position (referring to FIG. 8). Alternatively, the switch controller 8 can turn off the third motor windings 7 which is furthest from the stator 3 (referring to FIG. 9). Alternative turning off controls can still increase the rotating speed and the operation interval.

Figure 4C:
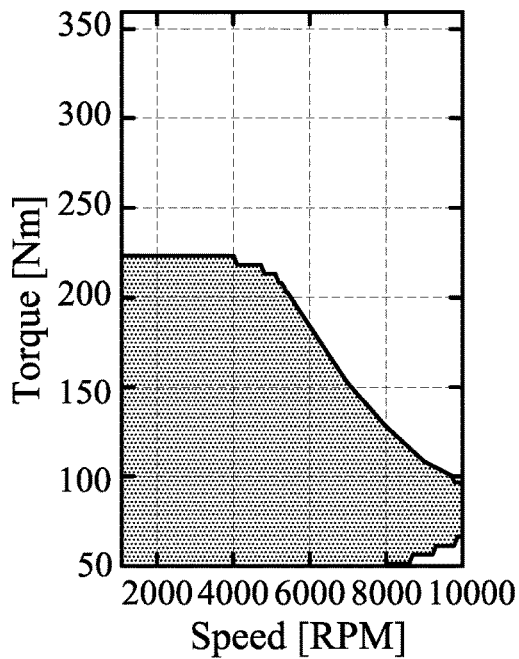
FIG. 4C is a graph of an operation interval of an electric motor in a state in which the number of turned-on winding groups is ½ less.

A comparison between FIG. 4B and FIG. 4C will be described below. Note that the embodiment of FIG. 4C is different to the embodiments of FIGS. 4A and 4B. For the embodiment of 4C, the motor windings in each of the phase windings of the stator of the electric motor comprise grouping three layers of conduction-wire respectively. In other words, each of the phase windings only has two windings. FIG. 4C shows the electric motor 100 when the number of turned-on windings is ½ less than the number of all windings of the phase windings. For example, in the graph shown, only one motor winding of each of the phase windings is turned on. With this configuration, although the rotating speed is up to 10000 rpm, the greatest torque is just up to 200 N·m. Compared to the operation interval shown in FIG. 4C (in which three layers of conduction-wire are turned off), FIG. 4B (only two layers of conduction-wire (one winding) are turned off) shows the top rotating speed of the electric motor can be also up to 10000 rpm and the top torque can be up to 270 N·m, providing an operation interval with a high-speed and a higher torque.

Next, how the electric motor 100 of the present invention selects the low-speed mode or the high-speed mode is described below. Specifically, a higher voltage is applied during the operation interval of the embodiment of FIG. 5, so the pattern of the operation interval is different than the embodiment of FIGS. 4A and 4B.

Figure 5:
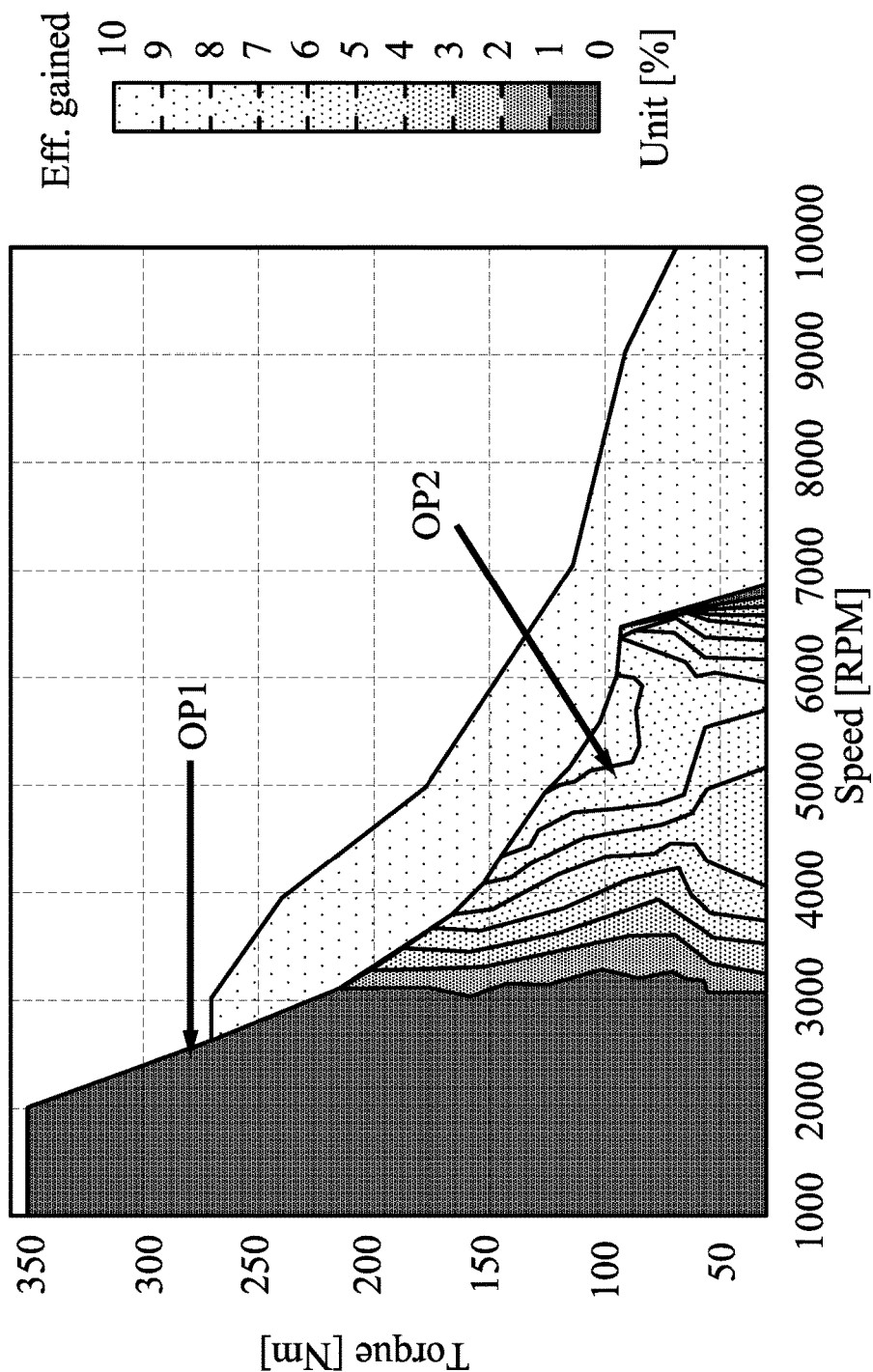
FIG. 5 is a graph showing an efficiency comparison of an operation interval between a fully turned-on state and a state in which the number of turned-on winding groups is ⅓ less.

FIG. 5 shows the graphs of the efficiency of the operation interval of the high-speed mode and the low-speed mode overlapped in the same picture. The efficiency of the operation interval of the low-speed mode is used as a reference value, and the efficiency gain (one example of drive efficiency parameters) that the high-speed mode compares to the low-speed mode is used as the contour lines to divide the graph into different blocks, wherein the efficiency gain of 0% means that the efficiency of the low-speed mode is higher than that of the high-speed mode. In other words, the high-speed mode does not have an efficiency gain over the low-speed mode. Furthermore, in this embodiment, the efficiency gain of the drive efficiency parameters corresponds to one condition under a same torque or a same rotating speed of the electric motor. Note that the drive efficiency parameters may correspond to additional or other conditions, such as fuel consumption rate or other conditions which can be indicators of drive efficiency under a same torque or a same rotating speed of the electric motor.

When the electric motor 100 operates in operation point OP1, the high-speed mode can achieve the target torque (larger than 270 N·m), so in this case the efficiency gain is 0% as shown in FIG. 5, and therefore the electric motor 100 operates in the low-speed mode. When the electric motor 100 operates in operation point OP2, the low-speed mode and the high-speed mode can achieve the required rotating speed and torque. However, in this case the efficiency gain is 8% as shown in FIG. 5, therefore the switch controller 8 turns off the number of windings to ⅓ less so that the electric motor 100 operates in the high-speed mode.

As described above, when all of the low-speed mode and the high-speed mode can achieve the target torque at the same rotating speed, the switch controller 8 selects the low-speed mode or the high-speed mode based on the drive efficiency that the electric motor 100 operates in different mode. In other words, based on the efficiency gain of different operation modes of the electric motor 100 shown in FIG. 5, the switch controller 8 is configured to turn on all the windings, or selectively choose to turn on ⅔ of the windings, so that the electric motor 100 has better drive efficiency.

The present electric motor 100 and the switch controller 8 of embodiments based on FIGS. 6 to 9 will be described below.

Figure 6A:
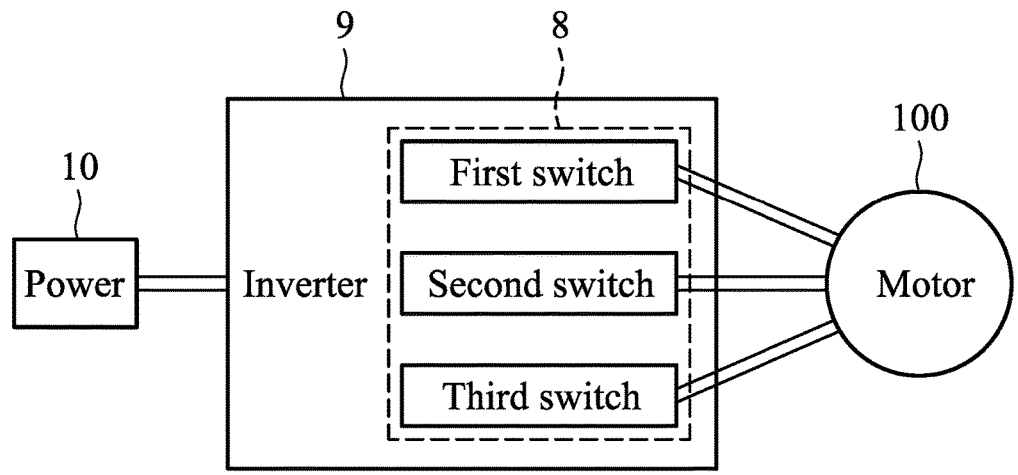
FIGS. 6A and 6B are schematic representations showing a motor control system according to different embodiments of the invention.

As shown in FIG. 6A, the electric motor 100 is connected to the power source 10 through the inverter 9. The inverter 9 transforms power of the power source to an alternating current with a plurality of phase windings, then inputs into the electric motor 100. The motor side provides two conduction pathways, one comprising the first motor winding 5, the second motor winding 6 and the third motor winding 7 conducted in series; and another comprising the first motor winding 5 being short-circuited. The switch controller 8 is disposed on the inverter 9, and switches the modes of the motor winding circuits. Correspondingly, the inverter 9 connects to the electric motor 100 through six conduction lines.

Referring to FIG. 7, in this embodiment, the windings structure 4 of the electric motor 100 has a V phase winding 41, a W phase winding 42 and a U winding phase 43, and a inverter 9 is connected to the three phase windings of the winding structure 4 by six conduction lines. Each of the phase windings respectively has the first motor winding 5, the second motor winding 6 and the third motor winding 7. The switch controller 8, for example, may be a device with three switches, each of the switches, for example, is a one-to-two multiplexer or a selector switch for connecting a first end L or a second end H of the first motor winding 5 to turn on or off the circuit (however, it is not limited). When the electric motor 100 operates in the high-speed mode, the first, second and third switches 81, 82 and 83 respectively disconnect the main switch circuits 811, 821 and 831, and turn on sub switch circuits 812, 822 and 832. Thus, the switch controller 8 switches to connect the second ends H of each of the first motor windings 5. With this configuration, only the second motor windings 6 and the third motor windings 7 of each of the phase windings are turned on. When the electric motor 100 operates in the low-speed mode, the first, second and third switches 81, 82 and 83 respectively disconnect the sub switch circuits 812, 822 and 832, and the main switch circuits 811, 821 and 831 are turned on. With this configuration, the switch controller 8 switches to connect the first ends L of each of the first motor windings 5. Thus, the first motor winding 5, the second motor winding 6 and the third motor winding 7 in each of the V phase winding 41, the W phase winding 42 and the U phase winding 43 are connected in series and all of them are turned on. Specifically, in an embodiment, the constitution of the switch controller 8 of FIG. 7 is the same as the switch controller 8 in the embodiment of FIGS. 2 and 3.

Figure 6B:
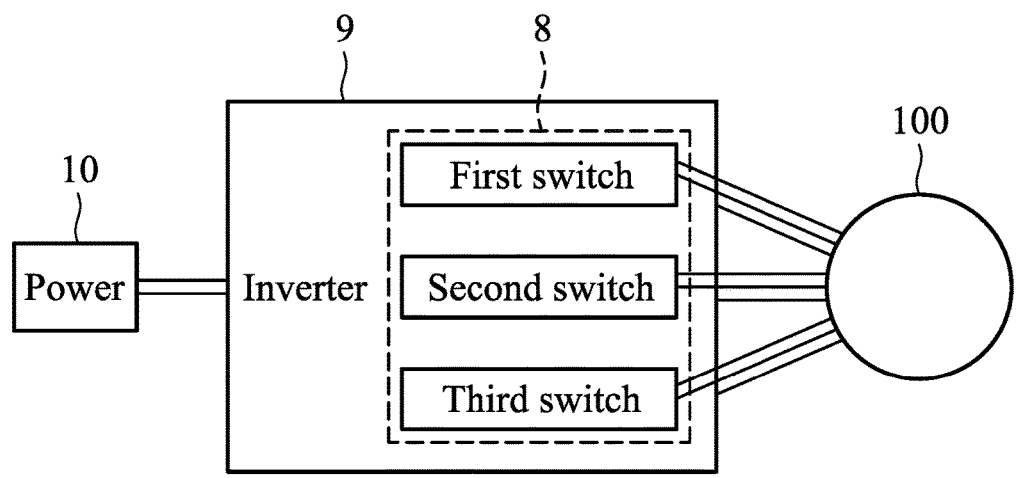

Next, referring to FIG. 6B, the difference compared to FIG. 6A is that the motor side provides different conductions pathways, one comprising the first motor winding 5, the second motor winding 6 and the third motor winding 7 conducted in series; and another comprising the second motor winding 6 or the third motor winding 7 being able to be short-circuited. Correspondingly, the inverter 9 connects to the electric motor 100 through nine conduction lines. The embodiments of FIGS. 8 and 9 correspond to the embodiment of FIG. 6B.

Referring to FIG. 8, the technical features similar to those shown in FIG. 7 are not repeated. In this embodiment, the switch controller 8, for example, may be a device with three switches. Each of the switches, for example, is a selector switch for connecting a first end L or a second end H of the second motor winding 6 to turn on or off the circuit. Furthermore, in this embodiment, the inverter 9 connects to an end of the first motor winding 5 of each of the phase windings through terminal lines 813, 823 and 833. When the electric motor 100 operates in the high-speed mode, the first, second and third switches 81, 82 and 83 turn on the main switch circuits 811, 821 and 831 and the sub switch circuits 812, 822 and 832 at the same time. Thus, the switch controller 8 switches to connect the switching circuit beside the second motor windings 6, and causes the second motor winding 6 to be inactive. With this configuration, only the first motor windings 5 and the third motor windings 7 of each of the phase windings are turned on. When the electric motor 100 operates in the low-speed mode, the first, second and third switches 81, 82 and 83 disconnect the main switch circuits 811, 821 and 831 and the sub switch circuits 812, 822 and 832 at the same time. With this configuration, the switch controller 8 turns off the pathway of the aforementioned between the first end L and the second end H, and the alternating current is input through the terminal lines 813, 823 and 833 from the inverter 9. Thus, the first motor winding 5, the second motor winding 6 and the third motor winding 7 in each of the V phase winding 41, the W phase winding 42 and the U phase winding 43 are connected in series and all of them are turned on.

Referring to FIG. 9, the technical features similar to those shown in FIG. 8 are not repeated. In this embodiment, the switch controller 8, for example, may be a device with three switches. Each of the switches, for example, is a selector switch for connecting a first end L or a second end H of the third motor winding 7 to turn on or off the circuit. When the electric motor 100 operates in the high-speed mode, the first, second and third switches 81, 82 and 83 turn on the main switch circuits 811, 821 and 831 and the sub switch circuits 812, 822 and 832 in the same time. Thus, the switch controller 8 switches to connect the switching circuit beside the third motor windings 7, and causes the third motor winding 7 to be inactive. With this configuration, only the first motor windings 5 and the second motor windings 6 of each of the phase windings are turned on. When the electric motor 100 operates in the low-speed mode, the first, second and third switches 81, 82 and 83 disconnect the main switch circuits 811, 821 and 831 and the sub switch circuits 812, 822 and 832 at the same time. With this configuration, the switch controller 8 turns off the pathway of the aforementioned between the first end L and the second end H, and the alternating current is input through the terminal lines 813, 823 and 833 from the inverter 9. Thus, the first motor winding 5, the second motor winding 6 and the third motor winding 7 in each of the V phase winding 41, the W phase winding 42 and the U phase winding 43 are connected in series and all of them are turned on.

Aspects of the present invention controls how the winding group is turned-on or turned-off by the switching controller 8. The switching controller 8 may be provided on the inverter 9 and the inverter 9 can output three phase current to the input ends of each phase of the electric motor 100 through at least six conduction lines. This may allow the output lines configuration to be more simplified. Further, by having the switching controller 8 disposed correspondingly with different winding groups, the turn-on or turn-off of the winding groups can be more easily controlled, and the low-speed mode and the high-speed mode can be easier to switch.

Furthermore, according to some embodiment of the present invention, an inverter 9' and a switching controller 8' together constitutes a motor control device. The inverter 9' is configured to input three phase currents into the electric motor to turn-on the layered hairpin windings. The switching controller 8' is configured to operate the motor control device in at least a high-speed mode and a low-speed mode. In the high-speed mode, the switching controller controls the input of the three phase currents to turn-on ⅔ of the total number of the layered hairpin windings. Therefore, the motor control device can individually connect to different hairpin winding groups, so as to control number of the turn-on layered hairpin windings of the connected electric motor. The other technical features of the inverter 9' and the switching controller 8' can be same as the inverter 9 and switching controller 8 described above.

In summary, by using the technical features recited above, the motor control system and the motor control device can increase the operation interval of an electric motor, decrease the complexity of the installation of lines in the inverter, and/or increase the convenience of assembling the electric motor. Furthermore, in addition to being applied to vehicles such as cars and motorcycles, applications of the technology is not limited and may be applied in other related fields.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motor control system capable of controlling turning-on and turning-off of a plurality of motor windings, the motor control system comprising:
    an electric motor comprising:
        a stator including an iron core with a plurality of slots formed therein along a radial direction of the stator;
        a rotor surrounded by the stator; and
        a winding structure having a plurality of hairpin wires with pins disposed in the slots, the hairpin wires forming a plurality of layers of conduction-wire, wherein the winding structure is configured to provide a plurality of phase windings and each phase winding includes a plurality of motor windings; and
    an inverter connected to the motor windings, the inverter including a switching controller configured to control the turning-on and turning-off of the motor windings of each phase winding of the winding structure, wherein when the electric motor operates in a high-speed mode, the switching controller controls the turning-on and turning-off of the motor windings of each phase winding such that a number of the phase windings turned-on is ⅓ less than a number of all the phase windings.

2. The motor control system as claimed in claim 1, wherein the winding structure includes a first motor winding, a second motor winding, and a third motor winding disposed sequentially in each of the slots along the radial direction of the stator from center to outer, and wherein the switching controller is configured to turn off any of the first, second, and third motor windings in the high-speed mode.

3. The motor control system as claimed in claim 2, wherein the hairpin wire pins are disposed in each of the slots along the radial direction of the stator from center to outer to provide a first layer, a second layer, a third layer, a fourth layer, a fifth layer, and a sixth layer of conduction-wire such that the layers are arranged concentrically, wherein the first motor winding includes the first and second layers of conduction-wire, the second motor winding includes the third and fourth layers of conduction-wire, and the third motor winding includes the fifth and sixth layers of conduction-wire, and wherein the first motor winding is disposed proximal to the center of the stator.

4. The motor control system as claimed in claim 3, wherein the first motor winding, the second motor winding and the third motor winding are connected in series.

5. The motor control system as claimed in claim 1, wherein the inverter is configured to receive power and respectively input three phase currents into the electric motor through six conduction lines to provide at least two operation modes, and wherein the operation modes include the high-speed mode and a low-speed mode.

6. The motor control system as claimed in claim 1, wherein the inverter is configured to receive power and respectively input three phase currents into the electric motor through nine conduction lines to provide at least two operation modes, and wherein the operation modes include the high-speed mode and a low-speed mode.

7. The motor control system as claimed in claim 1, wherein the electric motor is further configured to operate in a low-speed mode to provide higher torque, and wherein in the low-speed mode the switch controller controls all the phase windings to be turned on.

8. The motor control system as claimed in claim 7, wherein the switching controller is configured to turn on all the phase windings or selectively choose to turn on the phase windings, according to a drive efficiency parameter of different operation modes of the electric motor, and wherein the drive efficiency parameter corresponds to one or more conditions under a same torque or a same rotating speed of the electric motor.

9. A motor control device for driving an electric motor having a plurality of layered hairpin windings, the motor control device including:
an inverter configured to input three phase currents into the electric motor to turn-on the layered hairpin windings;
a switching controller configured to operate the motor control device in at least a high-speed mode and a low-speed mode,
wherein in the high-speed mode, the switching controller controls the input of the three phase currents to turn-on ⅔ of the total number of the layered hairpin windings.

10. The motor control device as claimed in claim 9, wherein the switching controller controls the input of the three phase currents to turn-on individual groups of the layered hairpin windings, and wherein the individual groups include a first, second, and third winding group.

11. The motor control device as claimed in claim 10, wherein each of the first, second, and third winding group includes two adjacent located layered hairpin windings, and wherein the switching controller controls each individual turn-on of the two adjacent located layered hairpin windings.

12. The motor control device as claimed in claim 9, wherein the three phase currents input into the electric motor turn-on the plurality of layered hairpin windings through series windings connection.

13. The motor control device as claimed in claim 9, wherein the inverter further includes six conduction lines coupled to input terminals of the layered hairpin windings of the electric motor.

14. The motor control device as claimed in claim 9, wherein the inverter further includes nine conduction lines coupled to input terminals of the layered hairpin windings of the electric motor.

15. The motor control device as claimed in claim 9, wherein in the low-speed mode, the switching controller is configured to control the input of the three phase currents to turn-on all the layered hairpin windings such that the electric motor provides a higher torque than the high-speed mode.

16. The motor control device as claimed in claim 9, wherein the switching controller is configured to control the input of the three phase currents to turn on all the layered hairpin windings or selectively choose to turn on the layered hairpin windings, according to a drive efficiency parameter of different operation modes of the electric motor, and wherein the drive efficiency parameter corresponds to one or more conditions under a same torque or a same rotating speed of the electric motor.

* * * * *